United States Patent [19]

Pantzar et al.

[11] Patent Number: 5,421,679
[45] Date of Patent: Jun. 6, 1995

[54] CUTTING INSERT HAVING A FLAT EDGE SURFACE FOR SUPPORTING THE INSERT IN A TOOL HOLDER

[75] Inventors: Göran Pantzar, Arsunda; Sven-Erik Carlsson, Gimo, both of Sweden

[73] Assignee: Sandvik AB, Sandviken, Sweden

[21] Appl. No.: 311,578

[22] Filed: Sep. 23, 1994

Related U.S. Application Data

[62] Division of Ser. No. 230,209, Apr. 20, 1994, which is a division of Ser. No. 4,302, Jan. 14, 1993, Pat. No. 5,365,805.

[30] Foreign Application Priority Data

Feb. 5, 1992 [SE] Sweden .................... 9200319

[51] Int. Cl.⁶ ..................... B23C 5/20; B23C 5/22
[52] U.S. Cl. ..................... 407/114; 407/113
[58] Field of Search ............... 407/113, 114, 115, 116, 407/117, 118, 119, 120

[56] References Cited

U.S. PATENT DOCUMENTS

| | | |
|---|---|---|
| 1,300,204 | 4/1919 | Waczula . |
| 4,294,565 | 10/1981 | Erkfritz . |
| 4,616,962 | 10/1986 | Ushijima et al. . |
| 4,632,608 | 12/1986 | Blomberg et al. . |
| 4,790,693 | 12/1988 | Koblesky . |
| 4,992,007 | 2/1991 | Satran . |
| 5,006,020 | 4/1991 | Roos . |
| 5,056,963 | 10/1991 | Kameno et al. . |
| 5,074,721 | 12/1991 | Kress et al. . |
| 5,078,550 | 1/1992 | Satran et al. . |
| 5,135,336 | 8/1992 | Noguchi et al. . |
| 5,145,295 | 9/1992 | Satran . |
| 5,199,827 | 4/1993 | Pantzar . |

FOREIGN PATENT DOCUMENTS 0489702 6/1992 European Pat. Off. .

*Primary Examiner*—William E. Terrell
*Attorney, Agent, or Firm*—Burns, Doane, Swecker & Mathis

[57] ABSTRACT

A cutting insert is produced by form-pressing and sintering of powder. The insert comprises a top chip surface, a bottom surface, and at least one edge surface extending between the top and bottom surfaces. The edge surface includes at least one relief surface portion which intersects the top surface at an acute angle to form therewith a cutting edge. A grinding operation is performed on the edge surface, but only along a lower portion thereof disposed below the relief surface portion, i.e., only along an area which is to be placed against a locating surface of a machine tool during a cutting operation.

6 Claims, 2 Drawing Sheets

CUTTING INSERT HAVING A FLAT EDGE SURFACE FOR SUPPORTING THE INSERT IN A TOOL HOLDER

This application is a Divisional of application Ser. No. 08/230,209, filed Apr. 20, 1994 which, in turn, in a Divisional of application Ser. No. 08/004,302 filed Jan. 14, 1993, U.S. Pat. No. 5,365,805.

BACKGROUND OF THE INVENTION

The present invention relates to a cutting insert for chipbreaking machining tools, in particular for milling tools such as facemilling tools, and to a process for making the insert.

Such an insert is typically manufactured by form-pressing and sintering of an insert-forming powder material to form a body which comprises a top chip surface, a suitably planar bottom surface that can rest upon a seat surface of the machining tool, and at least one edge surface extending between the top and bottom surfaces. The edge surface, which can be placed in abutment with at least one cooperating side abutment surface of the tool, is generally inclined at an acute angle with respect to the chip surface and at an obtuse angle with respect to the bottom surface, whereby a cutting edge is formed along the intersection of the chip surface and the edge surface, adjacent to which cutting edge there are one or several relief or clearance faces.

For the manufacturing of such cutting inserts, in particular indexable cutting inserts, of hard metal, a direct-pressing method is frequently used, in which a hard metal-forming powder first is formed to the intended shape in a suitable pressing die and then given the final strength and size by sintering in an oven at a temperature above 1000° C. The pressing operation as such has been further developed over the years and is today so advanced that it enables the formation of the cutting edges and adjacent chipforming faces and possible reinforcing faces with great dimensional precision. However, during the sintering operation a shrinkage takes place (usually amounting to about 18% of the original length in each dimension) and due to this, the cutting insert loses some of its original precision.

For some types of machining, e.g., some sorts of facemilling, the requirements of form and dimensional precision have become more rigorous over the last years. Particularly insert geometries with a positive cutting edge require a very high degree of dimensional accuracy to guarantee a satisfactory function at small tooth feeds. These precision requirements have up to now been met by so-called contour grinding, which consists of after-grinding the surface(s) adjacent to the individual cutting edge in one step after sintering. However, a serious disadvantage of such contour grinding is that it causes modifications in the micro-geometry of the insert, i.e., in the surface structure of the insert's edge-shaping parts after a surface treatment such as blasting, face grinding or deposition of a hardness-improving surface layer, which is usually done as soon as possible after the sintering has been finished. Thus, the width of existing negative reinforcing surfaces is altered, as well as the distance from the cutting edge to the chipforming surfaces. In practice, this means that the chipforming ability and the cutting performance of the cutting insert are diminished and that its strength and life are reduced.

SUMMARY OF THE INVENTION

An object of the present invention is to remove the above mentioned disadvantages by eliminating every form of after-grinding in the immediate proximity of the cutting edge(s). Thus, a primary object of the invention is to produce a cutting insert whose working dimensions can be established with high accuracy without necessitating any after-grinding of the cutting edges in question. A further object of the invention is to enable a simple and rational production of such inserts.

In a process aspect of the invention, a powder is pressed to form an insert body having a top chip surface, a bottom surface, and at least one edge surface interconnecting the top and bottom surfaces. The edge surface includes a relief surface portion intersecting the top surface at an acute angle to form therewith a cutting edge. That press-formed body is then sintered. Finally, the edge surface is ground, but only along a lower portion thereof disposed below the relief surface portion.

That lower portion of the edge surface is, during a cutting operation, placed against a locating surface of a machine tool. By subjecting only that lower surface portion to a grinding operation, the insert dimensions assume a much greater degree of precision while avoiding the aforementioned problems resulting when the entire edge surface and/or top surface are subjected to grinding.

BRIEF DESCRIPTION OF THE DRAWINGS

A preferred embodiment of the invention will be described below in detail with reference to the accompanying drawings in which.

DETAILED DESCRIPTION OF A PREFERRED EMBODIMENT OF THE INVENTION

Figure 1:
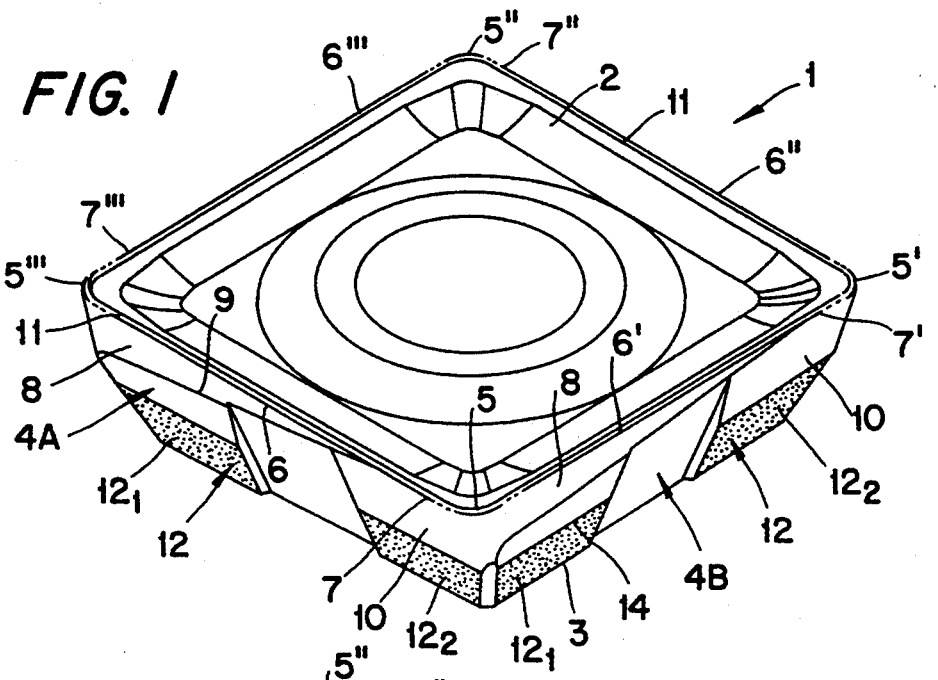
FIG. 1 is a simplified top perspective view of a cutting insert according to the present invention.
Figure 2:
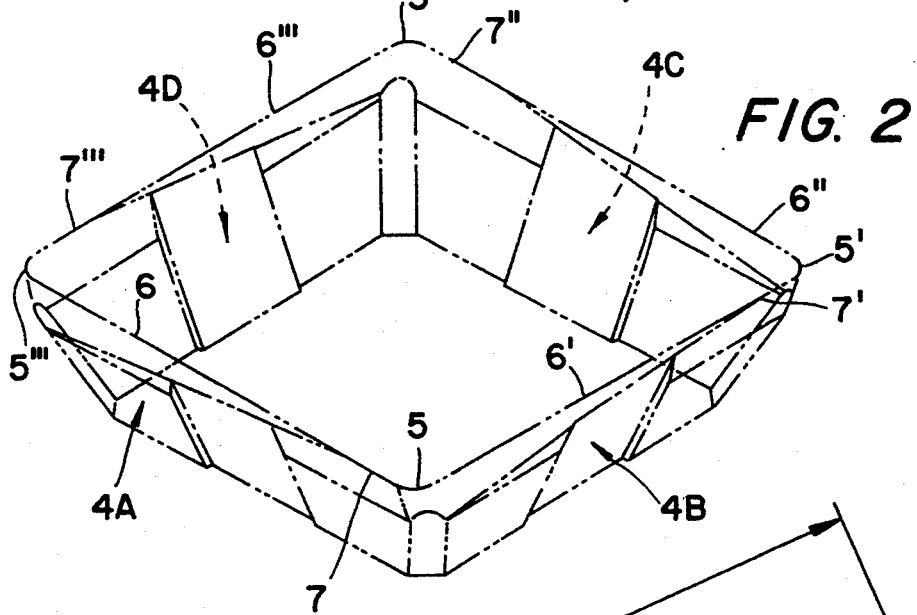
FIG. 2 is a transparent top perspective view of the same cutting insert.
Figure 3:
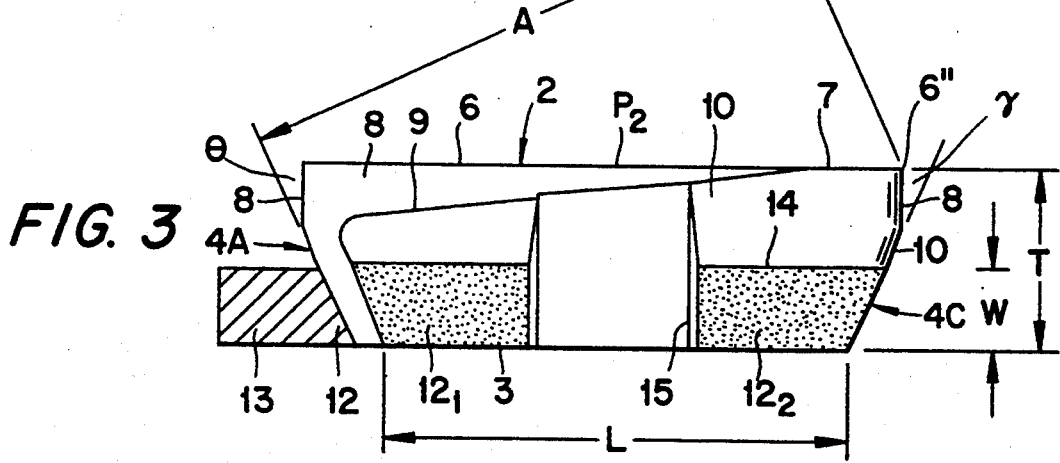
FIG. 3 is a side view of the cutting insert in connection with a schematically shown grinding tool.

In FIGS. 1–3, a cutting insert 1 of square basic shape is shown. The cutting insert comprises a top chip surface 2 and a suitably planar bottom surface 3 which is substantially parallel with the plane $P_2$ of the chip surface 2. In this square embodiment four identical edge surfaces 4A, 4B, 4C and 4D extend between the chip surface 2 and the bottom surface 3. The cutting insert has a positive geometry, meaning that the insert's edge surfaces 4 lie in planes that on the one hand form an obtuse angle with the plane of the bottom surface 3 and on the other hand form an acute angle with the plane of the chip surface $P_2$.

Disposed between adjacent edge surfaces are corners 5, 5', 5" and 5'". In the area between the chip surface 2 and one of the edge surfaces 4A are disposed two cutting edges, viz. a main cutting edge 6 and a secondary cutting edge 7. In an analogous manner, between chip surface 2 and another edge surface 4B are disposed a main cutting edge 6' and a secondary cutting edge 7', similar pairs of cutting edges 6", 7" and 6'", 7'" being formed in the transitions between the chip surface and each one of the edge surfaces 4C and 4D. Each main cutting edge 6 forms a certain angle with the secondary cutting edge 7 as the surface 2 is viewed in plan. In practice, this angle should lie within the range of 0.5°–4°.

Along a certain part of each edge surface, the cutting insert 1 has a planar relief surface 8, which extends along a substantial extent of the respective main cutting edge 6 and whose width or height increases toward a corner located adjacent that main cutting edge. For example, at the edge surface 4A, the width of relief surface 8 gradually decreases in the direction from the corner 5''' towards the corner 5. This relief surface 8 is oriented in a plane substantially perpendicular to the plane $P_2$, which is clearly shown in FIG. 3. Along a dividing or junction line 9 this first relief surface 8 joins a second relief surface 10, whose width decreases in the direction from the corner 5 towards the corner 5'''. This second relief surface 10 is inclined at an acute angle $\gamma$ in relation to the plane $P_2$ of the chip surface, for instance an angle within the range of 65°–75°, suitably around 70°, as shown in FIG. 3. The top surface 2 includes an upper reinforcing land 11 joining the cutting edges 6, 7 and having a substantially constant width, at least along the main cutting edge 6. This land preferably lies in the plane $P_2$ and joins an intermediate surface portion 11A which, in turn, joins a chipbreaking portion 2A of the top surface 2. The latter can include many different chip breakers.

In the center of the cutting insert there is a hole for the application of a suitable fastening means.

The cutting insert described so far has been previously described in Swedish Application 9003827-4 and European Publication No. 489 702.

Besides the two relief surfaces 8, 10, each edge surface 4A–4D according to the present invention also comprises a third surface portion 12 which is formed by grinding of the cutting insert. In FIG. 3 it is schematically illustrated how this third surface 12 can be produced by applying a grinding tool 13 against the edge surface in question. In FIG. 3 the grinding tool 13 is in contact with surface 4A. The cutting edge 6'' on the diametrically opposed side 4C functions as an abutment for positioning the insert 13 during the grinding operation. More specifically, the grinding tool is brought to such a depth that a precise dimension A is attained between the cutting edge 6'' and the diametrically opposed surface 12. This is important, since the ground surface 12 will abut a locating surface of a machine tool in order to position the diagonally opposite cutting edge during a cutting operation.

The inclination angle $\theta$ of the ground surface 12 in relation to the plane $P_2$ of the chip surface is in practice somewhat smaller than the previously mentioned inclination angle $\gamma$ of the other relief surface 10. In practice, the difference between those angles should lie within the range 1°–6° and preferably about 4°. Thus, if the angle $\gamma$ is 70°, then the angle $\theta$ should amount to about 66°. A junction edge 14 is thus formed between the two surfaces 10 and 12. In practice, this edge 14 should extend parallel to the bottom surface 3, giving the surface 12 a constant width W along its whole length. In practice, the width of this surface 12 is about half of the insert's thickness T, although it could alternatively be less or greater. However, the width W of the ground surface 12 should always amount to at least 40% of the insert's thickness T.

Naturally, the grinding operation is resource-demanding in that it requires time and energy. In order to reduce time and energy consumption to a minimum, the cutting insert has been provided with a preferably centrally placed recess 15 on each edge surface 4A–4D during the form-pressing step. This recess divides the ground surface on each side of the cutting insert into two surface portions $12_1$ and $12_2$. In practice, the length of the recess 15 can be as much as 25–35% of the whole length L of the ground surface 12, so that the total surface area of the surface portions $12_1$ and $12_2$ is about 75–65% of the area that the ground surface would have had if it had not been interrupted by the recess 15.

While the surfaces 8 and 10 next to the cutting edges are kept in the same shape as formed by form-pressing and sintering steps, the surfaces 12 are produced by grinding. This enables a very high degree of dimensional accuracy to be attained in that the tolerance of the afore-described dimension A between the individual grinding surface and a diametrically opposed cutting edge (i.e., the variance of that dimension A from a desired value) will lie within a very small range, i.e., the range 1–20 μm, preferably 1–10 μm. The individual ground surface 12 serves as an abutment surface in connection with a side abutment surface of the machining tool for positioning the insert during cutting.

Figure 4:
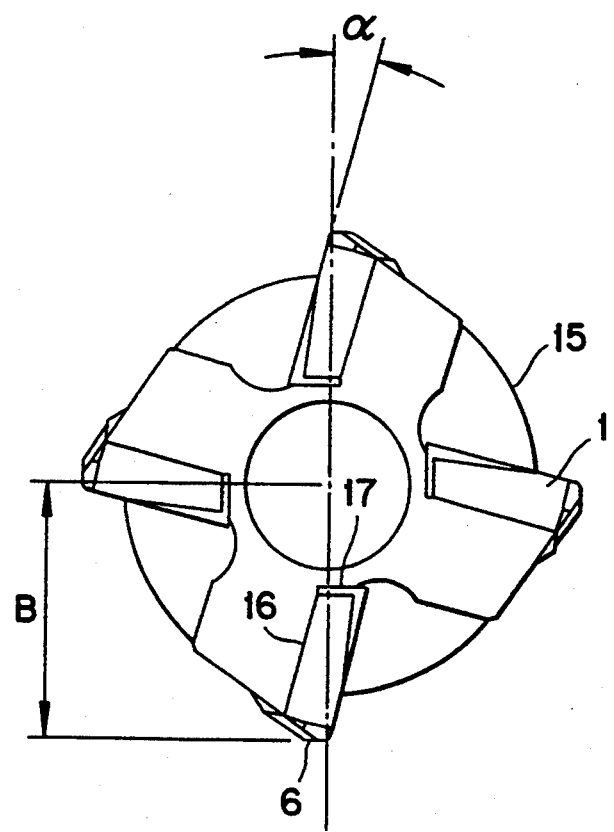
FIG. 4 is an end view of a facemilling tool equipped with cutting inserts according to the invention and illustrating the positioning of the inserts on the facemill.
Figure 5:
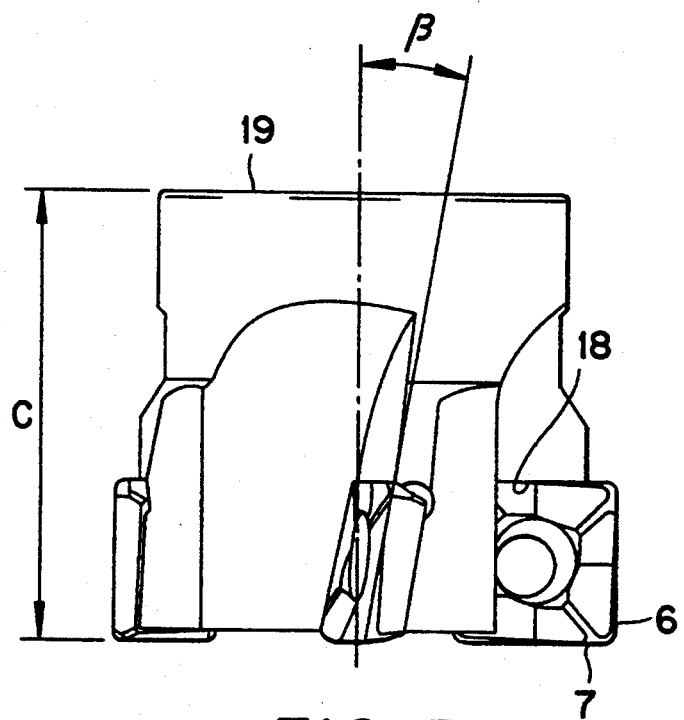
FIG. 5 is a side view of the facemill of FIG. 4.

FIGS. 4 and 5 illustrate a facemiller 15 equipped with a number of cutting inserts 1 according to the invention (although the cutting inserts in FIG. 5 are shown with a differently shaped chip surface than the cutting insert shown in FIG. 1). The cutting inserts are placed into recesses of the milling cutter 15 in such a way that the milled angle in the working piece will be 90°. In each individual recess of the milling cutter there are three separate abutment surfaces, viz. a bottom abutment or seat surface 16 against which the bottom surface 3 of the cutting insert is placed, a first side abutment surface 17 and a second abutment surface 18 against which two of the edge surfaces 12 of the cutting insert are placed, while the cutting edges of the other two edge surfaces are in a working position. Generally, the geometry is such that the radial rake angle $\alpha$ is negative and the axial rake angle $\beta$ is positive. Decisive for the machining accuracy is on the one hand the radial dimension B between the rotation axis of the milling cutter and a peripherally situated main cutting edge 6 on the individual cutting insert, and on the other hand the axial dimension C between the upper, planar surface 19 of the milling cutter and the secondary cutting edges 7 of the individual cutting insert. These dimensions B and C are, of course, dependent upon the dimension A between the individual cutting edge and the diametrically opposed abutment surface 12 which abuts either of the surfaces 17 and 18. By making this abutment surface 12 in the form of a ground surface, not only the benefit of high dimensional precision is realized, but also the basic advantage that the micro-geometry of the cutting insert can be maintained unchanged after sintering and a possible surface treatment. In this way, inter alia, the reinforcing faces 11 which were produced during the form-pressing and sintering steps, can keep their original width, and the chip breakers in the chip surface 2 can keep their positions in relation with the cutting edges.

The invention is naturally not restricted to what has been described above or to the embodiment illustrated in the drawings. Thus, it is also feasible to use the inventive concept for cutting inserts with another polygonal basic form than the square shape, e.g., a triangular shape. It is even feasible to produce circular cutting inserts with the lower portion of the sole circumferential edge surface being ground. Further, the cutting insert according to the invention can also be applied to other chipbreaking machining tools than just facemillers.

Moreover, it is pointed out that the cutting insert according to the invention need not necessarily have two cutting edges 6, 7 and two distinct relief surfaces 8, 10 separated by an inclined juncture edge 9. Rather, it is also possible to produce the cutting insert with only one relief surface and one single cutting edge along each side (in the case of a polygonal cutting insert), whereby that relief surface joins a ground surface having a smaller angle in relation with the chip surface than the relief surface.

Furthermore, the design of the chip breakers on the top surface of the cutting insert can vary quite considerably, as well as the form and the dimensions of all possible reinforcing faces.

The inventive concept is also applicable on cutting inserts made of other materials than hard metal, as long as a powder is form-pressed and sintered.

What is claimed is:

1. A cutting insert for chipbreaking machining, said insert comprising a pressed and sintered powder body having a top chip surface, a bottom surface, and at least one edge surface interconnecting said top chip surface to form therewith a cutting edge; said edge surface also intersecting said bottom surface; said edge surface including a recess having an upper end spaced below said cutting edge, and first and second sides extending downwardly from said upper end; a first insert-supporting surface portion extending from said first side of said recess in a direction away from said second side; a second insert-supporting surface portion extending from said second side of said recess in a direction away from said first side; each of said first and second insert-supporting surface portions being flat and coplanar and extending downwardly to said bottom surface; each of said first and second insert-supporting surface portions forming an identical acute angle with a plane of said top chip surface.

2. The cutting insert according to claim 1, wherein said recess has a length extending parallel to said cutting edge, said length being 25–35% of a combined length of said recess and said first and second insert-supporting surface portions as measured along said bottom surface.

3. The cutting insert according to claim 1, wherein said edge surface further includes at least one clearance surface disposed between said first and second insert-supporting surface portions and said cutting edge and forming a first acute angle with a plane of said top chip surface said first acute angle being larger than a second acute angle formed by each of said first and second insert-supporting surface portions with said plane.

4. The cutting insert according to claim 1, wherein said recess extends downwardly and intersects said bottom surface.

5. The cutting insert according to claim 1, wherein said edge surface comprises one of a plurality of identically configured edge surfaces of said insert; said edge surfaces intersecting to form corner portions of said insert.

6. The cutting insert according to claim 5, wherein there are four of said edge surfaces.

* * * * *